UNITED STATES PATENT OFFICE.

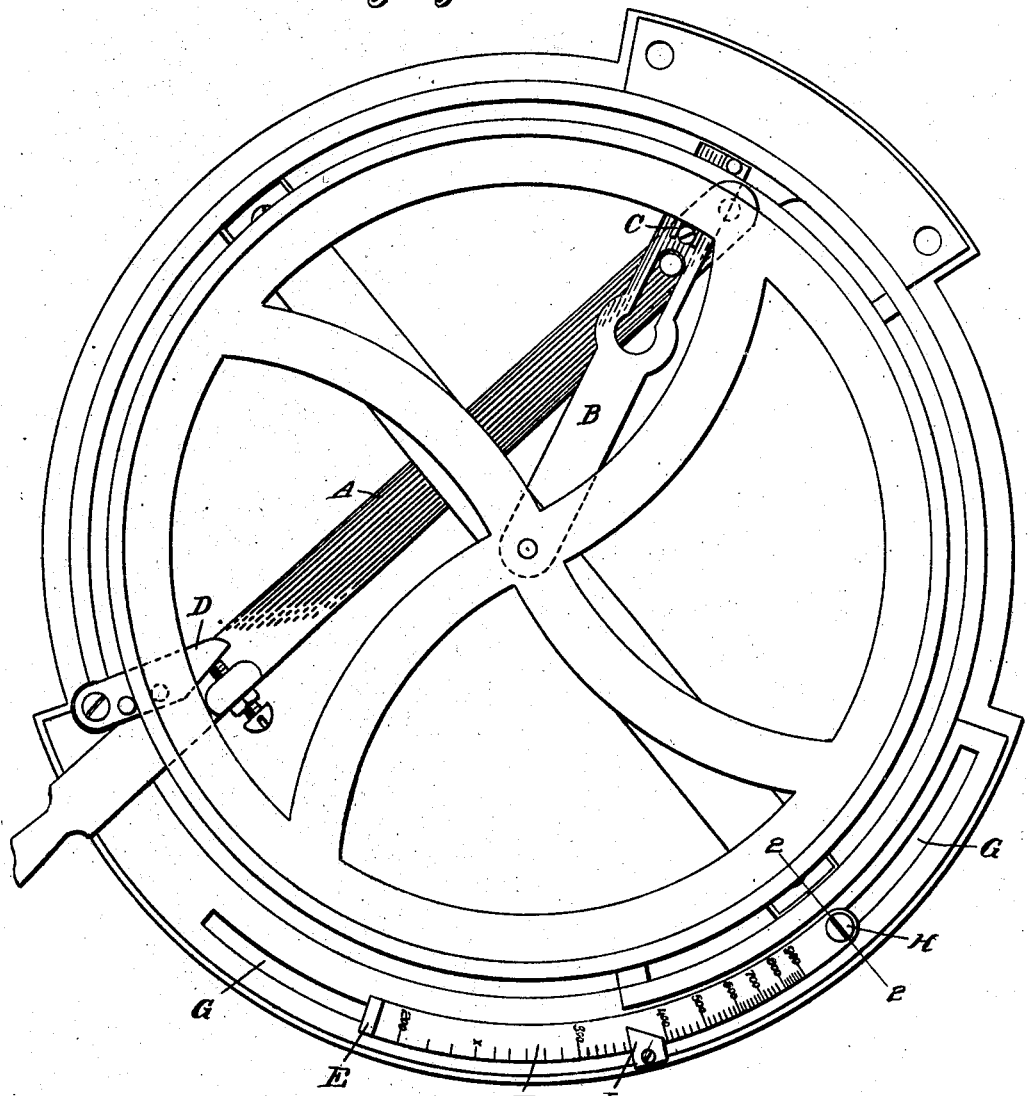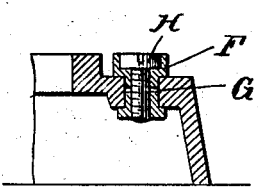

JOHN H. OSBORNE, OF ANDERSON, INDIANA.

COMPUTING CHEESE-CUTTER.

No. 894,527.   Specification of Letters Patent.   Patented July 28, 1908.

Application filed January 21, 1907. Serial No. 353,374.

*To all whom it may concern:*

Be it known that I, JOHN H. OSBORNE, a citizen of the United States of America, and a resident of Anderson, county of Madison, State of Indiana, have invented certain new and useful Improvements in Computing Cheese-Cutters, of which the following is a full and clear specification, reference being had to the accompanying drawings, in which—

Figure 1 is a plan view of a cheese cutter showing my invention applied thereto; and Fig. 2 a detail transverse section on the line 2—2 of Fig. 1.

This invention has relation to what are known as total-value cheese-cutters examples of which are shown in the patents to Birch #721,658, dated March 3, 1903, and McCroskey #673,781, dated May 7, 1901. In using these cheese-cutters the grocer does not have to weigh the cheese but simply to determine upon what total amount he desires to receive for the whole cheese and then set the scale for a stroke which will measure off a predetermined value, say five cents' worth.

The object of my improvement is to simplify and improve the scale means for regulating the throw of the actuating lever or other device, as more fully hereinafter set forth.

Referring to the drawings, A designates the actuating lever which is fulcrumed at its inner end to the base in the usual manner and which is connected to a radial link B by a pin and slot connection which link carries a clutch C for engaging the table on the actuating stroke of the lever.

D is an arrester which serves as one of the stops for restricting the stroke of the lever.

The foregoing parts are arranged substantially as shown in my former patents one of which is numbered 835,315, dated November 6, 1906.

The stop for restricting the forward stroke of the lever is designated by the letter E and is carried on the forward end of a bar F which lies upon the base outside of the table and is curved to conform to the curvature of the base and the table. This bar is provided with a total-value scale, the values running from the stop backward toward the other end of the bar, that is away from the lever. This scale-bar is clamped to the base in such manner that it may be adjusted back and forth to vary the stroke of the lever, the adjusting means consisting of an arcuate slot G formed in the base and a clamp screw H which is adapted to clamp the rear end of the scale-plate to the base and thus hold the scale-bar in its adjusted position. As will be observed this scale-bar is curved to conform to the curvature of the slot so as to cover the same and it is guided in its adjustment by means of a stop or guide bracket I fastened to the base, the part of this bracket which overlaps upon the upper face of the scale plate being utilized as a gage or pointer for indicating the point at which the scale is to be set for cheeses of different values.

It will be observed that all the grocer has to do is to set the scale-bar so that the gage or pointer shall be opposite the amount on the scale-bar which designates the total amount it is desired to sell the cheese for; then each stroke of the lever to the stop E and back again to the table arrester D will measure off a five-cent piece. It will be observed that the lever does not work upon or over the scale bar and also that the figures indicating the total values are arranged in regular order, so that the highest figure shall be farthest away from both the stationary and the movable stop.

Having thus fully described my invention, what I claim and desire to secure by Letters Patent, is:—

1. In a computing cheese-cutter, the combination of a base, a rotary table mounted thereon, an actuating lever and means engaged therewith for actuating the table, stops on the base for regulating the throw of the lever, one of these stops being carried at the forward end of a scale-bar carrying indications for total values, the values being arranged in regular order from the stop toward the other end of the scale bar, means for securing this scale-bar in its adjusted position, and a pointer or indicator on the base.

2. In combination, a base and a rotary table and lever-actuated means for rotating the table, a pair of stops on the table for regulating the throw of the lever, one of these stops being carried by a bar adjustably mounted on the base, means for clamping this bar in its adjusted position, and means for adjusting said bar consisting of a total-value scale and indicator on the bar.

3. In a computing cheese-cutter, the combination of a base, a rotary table, a lever for actuating the same, and means for regulating the throw of the lever, said means embodying a total-value scale bar slidably mounted on the base.

In testimony whereof I hereunto affix my signature in the presence of two witnesses this 17 day of January 1907.

JOHN H. OSBORNE.

Witnesses:
    GLAD. S. KING,
    G. A. EITELMANN.